United States Patent [19]
Labeur

[11] Patent Number: 6,007,283
[45] Date of Patent: Dec. 28, 1999

[54] MOTOR-VEHICLE CARGO RESTRAINT

[75] Inventor: Luc Labeur, Kessel-Lo, Belgium

[73] Assignee: Peter Butz GmbH & CO. Verwaltungs-KG, Langenfeld, Germany

[21] Appl. No.: 09/098,300

[22] Filed: Jun. 16, 1998

[30] Foreign Application Priority Data

Jun. 17, 1997 [DE] Germany .......................... 197 25 489

[51] Int. Cl.⁶ .................................................. B60P 7/08
[52] U.S. Cl. .......................... 410/97; 410/117; 410/129; 410/142; 410/100
[58] Field of Search .................................. 410/117, 118, 410/129, 100, 142, 97; 280/749; 224/42.33, 42.34; 296/24.1, 37.1, 37.5, 37.6, 37.8

[56] References Cited

U.S. PATENT DOCUMENTS

| | | | |
|---|---|---|---|
| 2,170,913 | 8/1939 | Rowe | 410/117 |
| 3,767,253 | 10/1973 | Kluetsch | 410/118 |
| 4,027,892 | 6/1977 | Parks | 410/3 |
| 5,207,260 | 5/1993 | Commesso | 410/118 X |
| 5,632,520 | 5/1997 | Butz | 410/118 X |
| 5,772,370 | 6/1998 | Moore | 410/100 |
| 5,788,310 | 8/1998 | McKee | 410/80 X |

FOREIGN PATENT DOCUMENTS

| | | |
|---|---|---|
| 0381911 A1 | 8/1990 | European Pat. Off. ............... 410/100 |
| 76 34 005 | 10/1976 | Germany . |
| 77 34 063 | 5/1977 | Germany . |
| 29500366 | 4/1995 | Germany .............................. 410/100 |
| 4426882C1 | 10/1995 | Germany .............................. 410/100 |
| 2131279A | 6/1984 | United Kingdom .................. 410/100 |
| 2229982A | 10/1990 | United Kingdom ................ 224/42.33 |

*Primary Examiner*—Stephen T. Gordon
*Attorney, Agent, or Firm*—Herbert Dubno

[57] ABSTRACT

A motor-vehicle has a storage compartment defined by a floor, walls, and a seat of the vehicle and provided with a cargo restraint system having an upright main rod and a mount holding the rod in the compartment for rotation about an upright main axis and including a retractor for rotationally urging the rod in one direction and for inhibiting rotation of the rod in the opposite direction under predetermined circumstances. An elongate flexible web has an inner end attached to the rod and an outer end and an outer rod fixed to the outer end of the web has a lower end engageable in any seat of an array of seats spaced from each other on the floor that releasably secure the outer rod to the floor at the respective seat in an upright position.

9 Claims, 3 Drawing Sheets

MOTOR-VEHICLE CARGO RESTRAINT

FIELD OF THE INVENTION

The present invention relates to a system for restraining cargo in a motor vehicle. More particularly this invention concerns such a cargo restraint usable in a station wagon, van, panel truck, or the like.

BACKGROUND OF THE INVENTION

As described in U.S. Pat. No. 5,632,520 a motor vehicle having a passenger compartment provided with pair of passenger seats and a luggage compartment behind the seats having a floor has a cargo-restraining apparatus provided with a support defining a horizontal pivot axis at the floor in the luggage compartment immediately behind the seats. A rigid panel has an inner edge pivoted at the pivot axis on the support and an outer edge and has oppositely directed faces extending between the edges.

The panel is movable between an erect position in which it is substantially vertical with its outer edge level with upper ends of the seats and a recumbent position lying on the floor with one of its faces directed upward and forming a cargo-support surface in the luggage compartment. An elongated housing on the panel normally contains a flexible retaining sheet that is extensible from the housing to restrain cargo in the luggage compartment.

In the system of German utility model 7,634,005a net is wound like a window shade about a rod that is provided on one of the window posts slightly behind the seat backs of the vehicle with its axis vertical. The net can be pulled out and strung across the space above the seat backs and attached at the opposite window post to restrain cargo or pets behind the seats. So that any object that is propelled forward against the net, for instance during a sudden stop or collision, is arrested, the net is dimensioned such that it is pulled all the way out when connected to the opposite window post. Thus even if an object does engage it, the net cannot be pulled any farther out and will therefore effectively stop the object.

Another system described in German utility model 7,734,063 has a net carried on a horizontally extending rod fixed to the seat backs. Such a net is pulled up to close the space behind the seats and prevent any cargo therein from coming over the seats during a sudden stop or collision. Such a system must be built to fit exactly in the particular vehicle and is not suitable for use as a retrofit. Furthermore, as in above-mentioned DE-GM 7,634,005, it serves merely as a shield for the vehicle passengers and does not restrain the cargo against shifting around in the cargo space behind the seats.

OBJECTS OF THE INVENTION

It is therefore an object of the present invention to provide an improved cargo restraint for a motor vehicle.

Another object is the provision of such an improved cargo restraint for a motor vehicle which overcomes the above-given disadvantages, that is which is usable to restrain cargo against shifting in a cargo compartment of a motor vehicle, and that can be adapted to different vehicles and work with cargo of different sizes.

SUMMARY OF THE INVENTION

A motor-vehicle has a storage compartment defined by a floor, walls, and a seat of the vehicle and provided according to the invention with a cargo restraint system having an upright main rod and a mount holding the rod in the compartment for rotation about an upright main axis and including a retractor for rotationally urging the rod in one direction and for inhibiting rotation of the rod in the opposite direction under predetermined circumstances. An elongate flexible web has an inner end attached to the rod and an outer end and an outer rod fixed to the outer end of the web has a lower end engageable in any seat of an array of seats spaced from each other on the floor that releasably secure the outer rod to the floor at the respective seat in an upright position. The outer rod may even according to the invention be secured back to the housing of the main rod to form the sheet into a closed loop around the cargo to be restrained. Such an arrangement can be used in the wayback of a station wagon, in the trunk of a standard sedan or limousine, in the rear baggage compartment of a sports-utility vehicle, or in the behind-seat compartment of a van.

The system therefore allows the sheet to be wrapped around the cargo to be restrained and normally is oriented on edge, that is in a warped vertical plane. It can be engaged around small or large freight. The predetermined circumstance under which the retractor prevents further unwinding of the web or sheet from the main rod can simply be the operation of a lock that arrests the main rod, or can be a motion- or speed-sensitive mechanism that, for instance, either locks up the rod when it is rotated too fast, or that locks the rod when it is reverse rotated slightly after being rotated forward.

A standard prior-art speed-dependent lockup system comprises at least one pawl pivoted on the main rod about an axis parallel to the rod and having relative to an unwinding direction a leading end that can pivot out and engage radially inwardly directed teeth formed in a stationary surrounding structure. The pawl is biased radially inward by a light-duty spring so that when the rod is rotated too fast, the radially outwardly effective centrifugal force forces out the leading end of the pawl and it engages radially in the teeth and stops the rod from rotating. Such systems are traditionally used on retractors for car seat belts and are standard. Above-cited DE-GM 77 34 063 discloses such a retractor.

According to the invention the rod projects past a respective longitudinal edge of the sheet and each of the seats forms a socket in which the rod end is complementarily receivable. The seats are uniformly distributed over the floor, in rows and columns of a rectilinear array. Each of the seats is formed as a sleeve set in the floor and has an end flange flush with the floor. It is possible to provide each of the seats and the lower end with means for releasably securing the outer rod in the seats, the means being for example a bayonet coupling.

The vehicle in accordance with the invention has upright walls delimiting the storage compartment and the housing is mounted on one of the walls. The walls include an end wall provided with a door and side walls. The housing is mounted on one of the side walls adjacent the seat. The housing can also be recessed in the one side wall.

BRIEF DESCRIPTION OF THE DRAWING

The above and other objects, features, and advantages will become more readily apparent from the following description, reference being made to the accompanying drawing in which.

SPECIFIC DESCRIPTION

Figure 2:
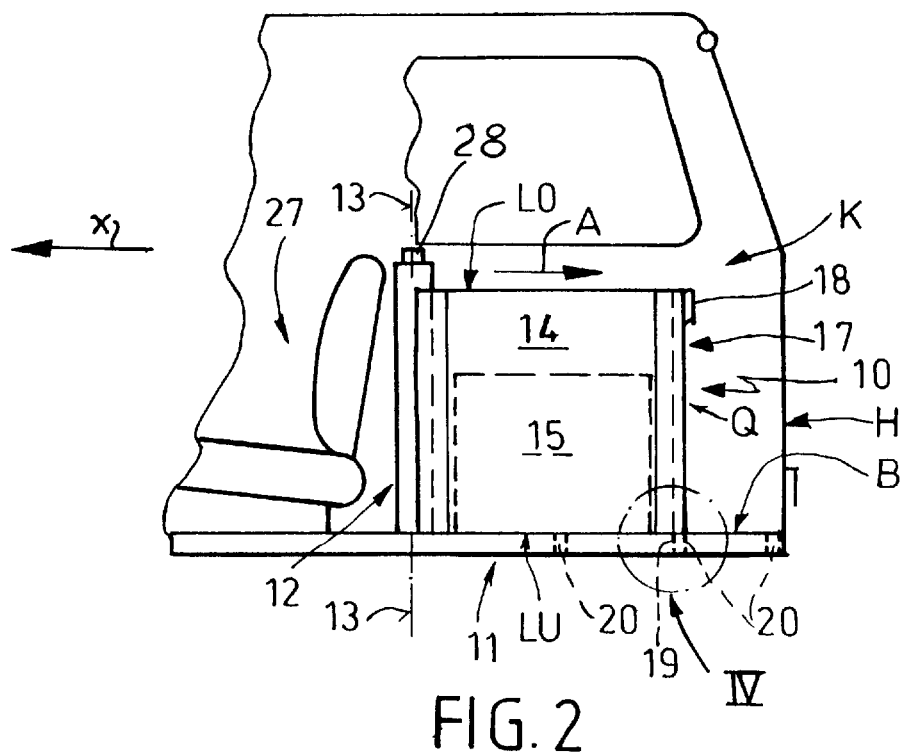
FIG. 2 is a side view taken in the direction of arrow II of FIG. 1.
Figure 1:
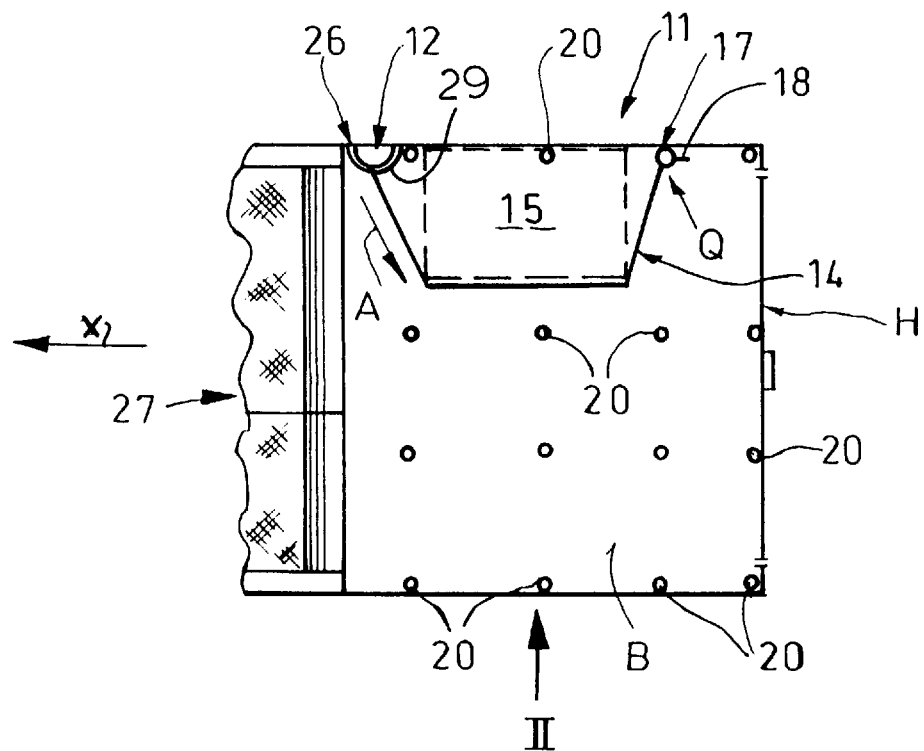
FIG. 1 is a small-scale top view of the system of this invention.

As seen in FIGS. 1 and 2 a motor vehicle 11 has a storage compartment K located forward in a travel direction x of a rear cargo door H and behind a back seat 27. Cargo such as shown at 15 is held in place on a floor B of this compartment K by a restraint system 10 according to the invention.

Figure 4:
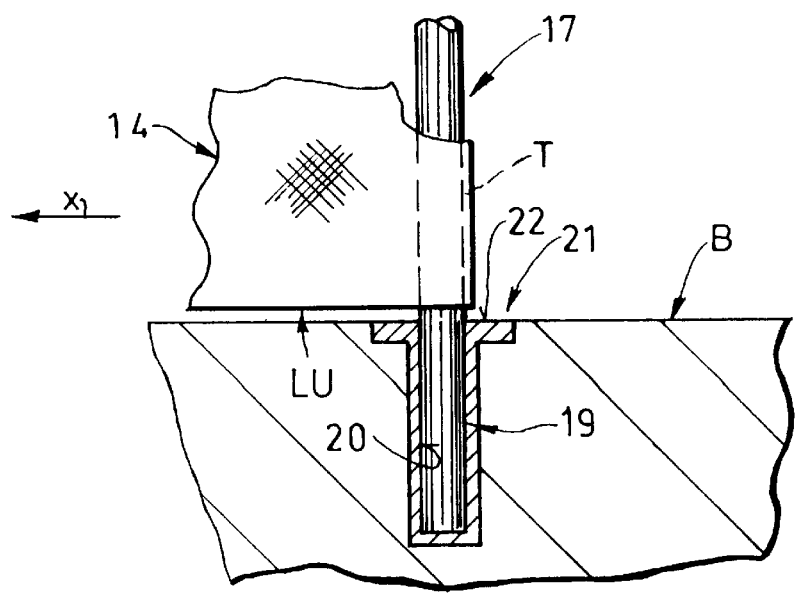
FIG. 4 is a large-scale sectional view of the detail indicated at IV in FIG. 2.

The restraint 10 has a vertical rod 28 rotatable about a vertical axis 13 and held in a housing or mount 12 having a retractor 29 of the speed-dependent lockup type that continuously biases the rod 28 rotationally in one direction and that also prevents rotation of the rod 28 in the opposite direction shown at A at more than a predetermined relatively slow speed. Alternately the mount 12 can be provided with a simple manual lock for arresting the rod 28 when desired. A flexible retaining sheet or net 14 has an inner end secured to the periphery of the rod 28, an upper edge LO and a lower edge LU that normally both extend horizontally, and a normally upright outer edge Q formed as a pocket T (FIG. 4) receiving another rod 17 forming a handle 18.

The rod 17 has a projecting lower end 19 that can be fitted into any of an array of seats 20 formed in the storage-compartment floor B. When fitting in one of the seats 20 an axis z of the rod 17 extends vertically, perpendicular to the floor B. As better shown in FIG. 4, each such seat 20 comprises a cylindrical sleeve 21 set into the floor B and having a flat top flange 22 that is flush with the plane of the floor B.

Figure 3:
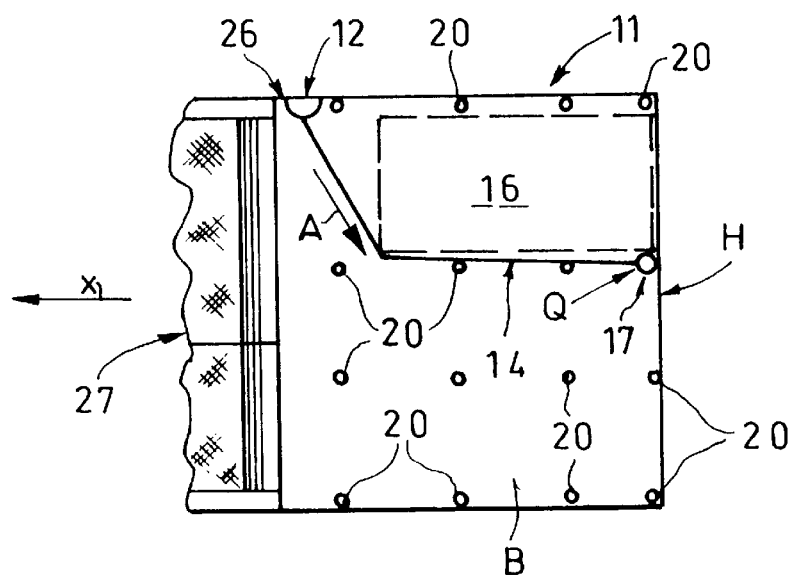
FIG. 3 is a view like FIG. 1 of another system according to the invention.

As shown in FIG. 1 the sheet 14 can be pulled out of the housing 12 like a window shade to wrap around the piece 15 of cargo sitting on the storage-compartment floor B. Here the rod 17 is fitted into one of the seats 20 adjacent a side wall 26 of the vehicle 11 in which the housing 12 is partially recessed. In FIG. 3, cargo 16 is secured in a corner of the compartment since here, as in FIG. 1, the housing 12 is secured to the side wall 26, but the rod 17 is fitted in a seat 20 adjacent the rear wall formed by the hatch door H.

Figure 5:
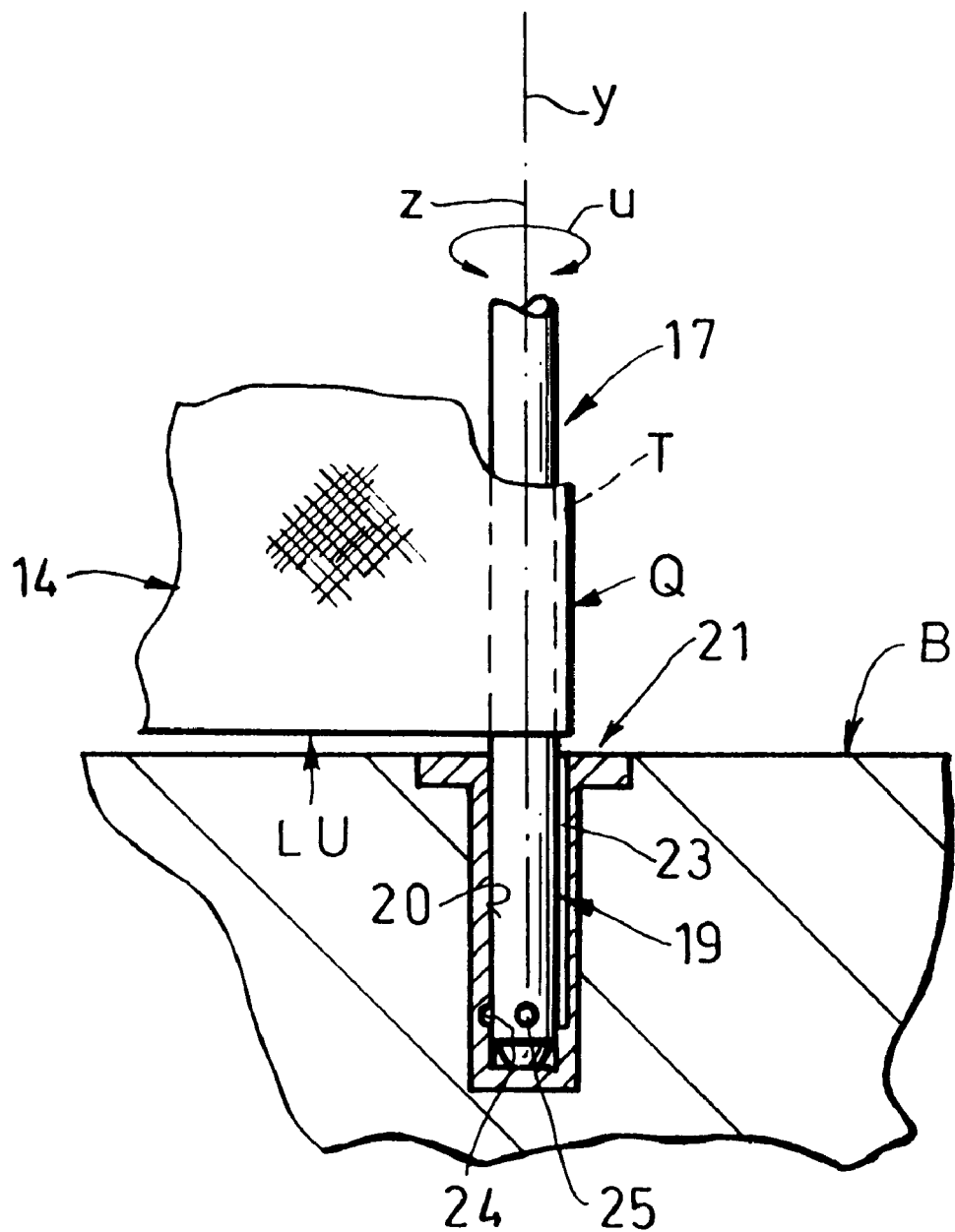
FIG. 5 is a view like FIG. 4 showing a variant on the system of this invention.

In FIG. 5 a sleeve 21' is formed with a radially inwardly open axial groove 23 and, meeting its lower end, a radially inwardly open annular groove 24. The end 19 of the rod 17 is provided with a short transversely projecting pin 25 forming with the grooves 23 and 24 a bayonet coupling. Thus the rod 17 is fitted down into the sleeve 21' with the pin 25 first riding along the groove 23, then it is rotated as shown by arrow u to move the pin 25 around in the groove 24 so that the rod 17 cannot pull up out of the seat 20.

I claim:

1. In a motor-vehicle having a storage compartment defined by a floor, side walls, and a seat of the vehicle, a cargo restraint system comprising:

an upright main rod;

a mount holding the rod in the compartment for rotation about an upright main axis and including retractor means for rotationally urging the rod in one direction and for inhibiting rotation of the rod in the opposite direction under predetermined circumstances;

an elongate flexible wide sheet having an inner end attached to the rod, an opposite outer end, an upper edge extending between the ends, and a lower edge extending generally parallel below the upper edge between the ends;

an outer rod fixed to the outer end of the sheet and having a lower end projecting past the lower edge;

means including an array of sockets spaced from each other on the floor and each engageable with the outer-rod lower end for releasably securing the outer rod to the floor at the respective socket in an upright position with the sheet lower edge closely juxtaposed with the floor and the sheet upper edge spaced substantially above the sheet lower edge; and means including interengaging structure in the sockets and on the lower end for releasably securing the outer rod in the sockets.

2. The restraint system defined in claim 1 wherein the sockets are uniformly distributed over the floor.

3. The restraint system defined in claim 2 wherein the sockets are distributed in rows and columns.

4. The restraint system defined in claim 1 wherein each of the sockets is formed as a sleeve set in the floor.

5. The restraint system defined in claim 4 wherein each sleeve has an end flange flush with the floor.

6. The restraint system defined in claim 1 wherein the means for securing includes a bayonet coupling.

7. The restraint system defined in claim 1 wherein the side walls are upright and delimit the storage compartment and the mount is mounted on one of the walls.

8. The restraint system defined in claim 7 wherein the one of the side walls is provided with a door, the mount being mounted on another of the side walls.

9. (equivalent of original claims 1, 7, and 8) In a motor-vehicle having a storage compartment defined by a floor, walls, and a seat of the vehicle, a cargo restraint system comprising:

an upright main rod;

a mount holding the rod in the compartment for rotation about an upright main axis and including retractor means for rotationally urging the rod in one direction and for inhibiting rotation of the rod in the opposite direction under predetermined circumstances;

an elongate flexible sheet having an inner end attached to the rod and an outer end;

an outer rod fixed to the outer end of the sheet and having a lower end;

means including an array of seats spaced from each other on the floor and each engageable with the outer-rod lower end for releasably securing the outer rod to the floor at the respective seat in an upright position; and means including a bayonet coupling in each of the seats for releasably securing the outer rod therein.

* * * * *